United States Patent
Gan et al.

(10) Patent No.: US 9,045,584 B2
(45) Date of Patent: *Jun. 2, 2015

(54) OXAZOLIDONE RING CONTAINING VINYL ESTER RESIN AND PRODUCTS THEREFROM

(75) Inventors: Joseph Gan, Strasbourg (FR); Patrick P. Yan, Shanghai (CN); Yan L. Feng, Shanghai (CN); Wayne Y. Zhang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/123,912

(22) PCT Filed: Jul. 30, 2012

(86) PCT No.: PCT/US2012/048789
§ 371 (c)(1),
(2), (4) Date: Dec. 4, 2013

(87) PCT Pub. No.: WO2013/019705
PCT Pub. Date: Feb. 7, 2013

(65) Prior Publication Data
US 2014/0135457 A1    May 15, 2014

(30) Foreign Application Priority Data

Aug. 1, 2011 (WO) ................ PCT/CN2011/077872

(51) Int. Cl.
| | |
|---|---|
| *C08G 59/14* | (2006.01) |
| *C08G 59/17* | (2006.01) |
| *C08G 59/16* | (2006.01) |
| *C08L 63/04* | (2006.01) |
| *C08L 63/10* | (2006.01) |
| *C08F 26/02* | (2006.01) |
| *C08G 73/06* | (2006.01) |
| *C08F 212/08* | (2006.01) |
| *C08F 220/06* | (2006.01) |

(52) U.S. Cl.
CPC ........ *C08G 59/1466* (2013.01); *C08G 59/1455* (2013.01); *C08G 59/1461* (2013.01); *C08L 63/04* (2013.01); *C08L 63/10* (2013.01); *C08F 26/02* (2013.01); *C08F 212/08* (2013.01); *C08F 220/06* (2013.01); *C08G 73/06* (2013.01)

(58) Field of Classification Search
CPC ........... C08G 59/1455; C08G 59/1461; C08G 59/1466; C08L 63/04; C08L 63/10
USPC .......................... 525/523, 524, 526, 528, 531
See application file for complete search history.

(56) References Cited

U.S. PATENT DOCUMENTS

| | | | |
|---|---|---|---|
| 4,742,146 A | | 5/1988 | Hefner, Jr. |
| 4,786,693 A | | 11/1988 | Hefner, Jr. |
| 5,112,932 A | * | 5/1992 | Koenig et al. ............ 528/51 |
| 2009/0233231 A1 | * | 9/2009 | Murata et al. ............ 430/285.1 |
| 2011/0037028 A1 | | 2/2011 | Valette et al. |

FOREIGN PATENT DOCUMENTS

| | | | |
|---|---|---|---|
| EP | 301268 A1 | 2/1989 | |
| JP | 55155012 | 3/1980 | |
| JP | 2001240651 A | 9/2001 | |
| JP | 2007-153978 | * 6/2007 | ............ C08G 59/14 |
| JP | 2007153978 A | 6/2007 | |

OTHER PUBLICATIONS

International Search Report and Written Opinion for PCT/CN2011/077872, Mail Date May 10, 2012, 9 Pages.
International Preliminary Report on Patentability for PCT/CN2011/077872, Dated Oct. 21, 2013, 8 Pages.
International Search Report on Patentability for PCT/US2012/048789, Issue Date Feb. 4, 2014, 6 Pages.
International Search Report and Written Opinion for PCT/US2012/048789, Mail Date Sep. 19, 2012, 8 Pages.

* cited by examiner

*Primary Examiner* — Robert Jones, Jr.

(57) ABSTRACT

A process comprising contacting a) an epoxy resin; b) an adduct comprising at least one oxazolidone ring prepared from a multifunctional epoxy resin and an isocyanate compound; and c) an unsaturated acid to form a vinyl ester, is disclosed.

10 Claims, 2 Drawing Sheets

OXAZOLIDONE RING CONTAINING VINYL ESTER RESIN AND PRODUCTS THEREFROM

REFERENCE TO RELATED APPLICATIONS

The present application claims the benefit of International Application No. PCT/CN11/077,872, filed on Aug. 1, 2011.

BACKGROUND OF THE INVENTION

1. Field of the Invention

The present invention relates to novel vinyl ester (VER) containing oxazolidone ring; and more specifically, the present invention relates to novel VER containing oxazolidone ring prepared from a) an epoxy resin; b) an adduct comprising at least one oxazolidone ring prepared from a multifunctional epoxy resin and an isocyanate compound; and c) an unsaturated acid, the process of manufacturing the VER, and compositions therefrom.

2. Description of Background

Vinyl ester products have been widely used for composite applications. High temperature resistance combined with high toughness is one of the key requirements in composite applications which require that the cured composites should have high Tg with wider processing window.

Oxazolidone-containing epoxy resins used to make VER are known. Epoxy-MDI adducts can react in the presence of a vinyl monomer solution with a specific catalysts such as ammonium or phosphonium salts. Another preferred variant of vinyl ester resins is obtained when oxazolidone group-containing polyepoxide resins from bisepoxides and diisocyanates are used as oligomeric epoxide resins. After reaction of these with methacrylic acid in styrene solution, they represent valuable vinyl ester resins also in the acidified form; they are characterized by high mechanical strength combined with high thermo-stability and hydrolysis resistance in the hardened state.

Additional compositions that are known include vinyl esters that bear one or more oxazolidone rings per molecule on average, and vinyl esters that have phosphorous atoms and one or more oxazolidone rings per molecule on average, which are prepared from bifunctional epoxy resins such as bisphenol A epoxy resins, bisphenol F epoxy resins, and bisphenol S epoxy resins. In an embodiment, the present invention provides vinyl ester made from oxazolidone containing multi-functional epoxy resins and it was showed that use of such multi-functional resins can increase the thermal resistance as well as the processing window (longer gel time).

SUMMARY OF THE INVENTION

In the present invention, there is disclosed a novel vinyl ester compound and a process comprising, consisting of, or consisting essentially of: contacting: a) an epoxy resin; b) an adduct comprising at least one oxazolidone ring prepared from a multifunctional epoxy resin and an isocyanate compound; and c) an unsaturated acid to form a vinyl ester.

DETAILED DESCRIPTION OF THE INVENTION

In the following detailed description, the specific embodiments of the present invention are described in connection with its preferred embodiments. However, to the extent that the following description is specific to a particular embodiment or a particular use of the present techniques, it is intended to be illustrative only and merely provides a concise description of the exemplary embodiments. Accordingly, the present invention is not limited to the specific embodiments described below, but rather; the invention includes all alternatives, modifications, and equivalents falling within the true scope of the appended claims.

Unless otherwise stated, a reference to a compound or a component includes the compound or component by itself, as well as in combination with other compounds or components, such as mixtures or combinations of compounds.

As used herein, the singular forms "a," "an," and "the" include the plural reference unless the context clearly dictates otherwise.

The Process and the Novel Vinyl Esters

In an embodiment, the present invention includes a process comprising, consisting of, or consisting essentially of: contacting: a) an epoxy resin; b) an adduct comprising at least one oxazolidone ring prepared from a multifunctional epoxy resin and an isocyanate compound; and c) an unsaturated acid to form a vinyl ester.

Epoxy Resin

The epoxy resin component can be any type of epoxy resin useful in molding compositions, including any material containing one or more reactive oxirane groups, referred to herein as "epoxy groups" or "epoxy functionality."

Examples of the epoxy resin used can include, but are not limited to phenol novolac epoxy resins, bisphenol-A novolac epoxy, tris-epoxy, cresol-novolac epoxy resins, polyfunctional epoxy resins, naphthalene epoxy resins, divinylbenzene, dicyclopentadiene-type epoxy resins, phosphorus-containing epoxy resins, multi-aromatic epoxy resins, and mixtures thereof.

The epoxy resin is generally present in the reaction mixture in the range of from about 0 weight percent to about 99 weight percent, based on the total weight of the reaction mixture. In another embodiment, the epoxy resin is present in an amount in the range of from about 20 weight percent to about 80 weight percent, and in yet another embodiment, from about 30 weight percent to about 60 weight percent, based on the total weight of the reaction mixture.

Adduct

In one embodiment, the at least one oxazolidone ring containing adduct (a) may comprise a reaction product of (i) at least one multifunctional epoxy resin and (ii) at least one isocyanate compound.

The multifunctional epoxy resin generally has an epoxy equivalent weight (EEW) of from 100 to 300 and an epoxy functionality of more than 2.1.

Examples of multifunctional epoxy resins include, but are not limited to phenol novolac epoxy resins (such as D.E.N™ 438, D.E.N.™ 439 from Dow, KEP-1138 from Kolon Industries), cresol-novolac epoxy resins, bisphenol-A novolac epoxy (such as KEP-3165 available from Kolon Industries), epoxidized tetrafunctional phenol ethane (such as EPON™ 1031), epoxidized cyclohexane tetraphenol, trisepoxy (such as Taxtic™ 742), polyfunctional epoxy resins, naphthalene epoxy resins, divinylbenzene, dicyclopentadiene-type epoxy resins, phosphorous containing epoxy resin, multi aromatic epoxy resins, and mixtures thereof.

Structures for multifunctional epoxy resins used in embodiments of the invention are found below:

Phenol novolac epoxy

Cresol novolac epoxy

Dicyclopentadiene epoxy

Biphenyl epoxy

Bisphenol-a novolac epoxy

The isocyanate compound used generally has an IEW in the range of from about 100 to about 500.

The isocyanates may also be any mixture of the isomers of an isocyanate, for example a mixture of the 2,4- and 2,6- isomers of MDI or a mixture of any 2,2'-, 2,4'- and 4,4'- isomers of TDI.

Examples of commercially available polyisocyanates that are suitable for the present invention include, for example, ISONATE™ M124, ISONATE™ M125, ISONATE™, OP 50, PAPI 27, VORONATE™ M229, and VORANATE™ T-80, available from The Dow Chemical Company.

A catalyst or a mixture of catalysts may be used to make oxazolidone containing adducts. More preferred catalysts suitable for the present invention include amine-containing compounds such as 1,8-Diazabicyclo[5.4.0]undec-7-ene (DBU), imidazole derivatives including 2-methyl imidazole, 2-phenyl imidazole (2-PhI); phosphonium and 30 ammonium salts; and any mixture thereof. Most preferred catalysts used in the present invention are 2-PhI and DBU. It has been discovered that both catalysts yield high percentages of oxazolidone rings (e.g. greater than about 95% of oxazolidone conversion), and low percentages of isocyanurate rings (e.g. less than 5% of isocyanurate conversion) under the reaction temperatures being considered (i.e. about 150° C. to about 200° C.).

The adduct is generally present in the reaction mixture in the range of from about 0.1 weight percent to about 100 weight percent, based on the total weight of the reaction mixture. In another embodiment, the adduct is present in an amount in the range of from about 2 weight percent to about 80 weight percent, and in yet another embodiment, from about 4 weight percent to about 50 weight percent, based on the total weight of the reaction mixture.

Unsaturated Acid

An unsaturated acid is contacted with the adduct. Generally, examples of unsaturated acids that can be used include, but are not limited to acrylic acid, methacrylic acid, cinnamic acid, crotonic acid, sorbic acid, monomethyl maleate, monobutyl maleate, and half esters of unsaturated dibasic acids. These may be used alone or in combinations of two or more.

The unsaturated acid is generally present in the reaction mixture in the range of from about 1 weight percent to about 60 weight percent, based on the total weight of the reaction mixture. In another embodiment, the unsaturated acid is present in an amount in the range of from about 5 weight percent to about 50 weight percent, and in yet another embodiment, from about 10 weight percent to about 40 weight percent, based on the total weight of the reaction mixture.

Accelerator(s)/Catalysts

If desired, the process of the present invention can include one or more accelerators or catalysts, for the reaction between the oxazolidone ring-containing adduct and the unsaturated acid.

Suitable catalysts include but are not limited to quaternary ammonium salts such as halides, acetates or formats. In an embodiment, the halides are represented by formula (I):

where

R1, R2 and R3, independently of each other, are unsubstituted or optionally

OH-substituted alkyl groups with 1-16 carbon atoms, and

R4 is an alkyl with 1-16 carbon atoms, phenyl or benzyl and

Y is a halogen such as F, Cl, Br, I, acetate or formate.

Such catalysts are for instance described in GB-PS 1 364 804, herein incorporated by reference. In an embodiment, tetraethyl- and tetrabutyl-ammonium bromide or -chloride and triethyl-benzyl-ammonium chloride or -bromide can be used.

Suitable catalysts can also include phosphonium halides as represented by formula (II):

where

Y is a halogen such as Cl, Br or I, or acetate and

R1, R2, R3 and R4, independently of each other, are groups with 1 to 18 carbon atoms per molecule, preferably alkyl groups, cycloalkyl groups, alkaryl groups, or arylalkyl groups.

Suitable phosphonium salts can also be used. These are described in DE 37 20 759 A1, herein incorporated by reference. Examples of phosphonium compounds include tetrabutyl-phosphonium-bromide or -chloride, or triphenylbenzyl-phosphonium-chloride or -bromide.

The catalyst is generally present in the range of from about 0 weight percent to about 10 weight percent, preferably from about 0 weight percent to about 8 weight percent, more preferably from about 0 weight percent to about 2 weight percent, based on the total weight of the reaction mixture.

Amino compound catalysts that can be used include, but are not limited to BDMA (benzyl dimethyl amine), BTMAC (benzyl trimethylammonium chloride), BTEAC(benzyl triethylammonium chloride), BTMAB(benzyl trimethylammonium bromide), BTEAB(benzyl triethylammonium bromide), and DMP-30 (tri(dimethylaminomethyl)phenol).

Chromium salt catalysts can also be used. Examples include but are not limited to Hycat OA, Hycat 2000, and Hycat 3000S.

Vinyl Ester Product

The vinyl ester product obtained generally has a formula represented by Formula III:

Formula III $R_1$ is a phenyl or polymeric phenyl ring structure or a derivative;

$R_2$ is phenoxy or polymeric phenoxy ring structure or a derivative;

$R_3$ is an alkyl group, an alkoxy group, a phenyl ring structure, a polymeric phenyl ring structure, derivatives of phenyl ring structures, derivatives of polymeric ring structures, a phenoxy ring structure, a polymeric phenoxy ring structure, derivatives of phenoxy ring structures, and derivatives of polymeric phenoxy ring structures;

R is a hydrogen group, an alkyl group, an alkoxy group or a phenyl or a polymeric phenyl ring structure or a derivative or a phenoxy or a polymeric phenoxy ring structure or a derivative;

y is an integer of at least 1; and z is an integer between 0 and 5.

In an embodiment, the vinyl ester product is represented by Formula IV:

Formula IV

Optional Component—Filler(s)

Filler can be used as an optional component with the vinyl ester product. When the composition contains inorganic filler, the inorganic filler can generally be any inorganic filler, including but not limited to silica, talc, quartz, mica, and flame retardant fillers such as aluminum trihydroxide, magnesium hydroxide, or boehmite.

The concentration of inorganic filler is generally between about 0 weight percent to about 95 weight percent, based on the total weight of the composition, preferably between about 0 weight percent to about 90 weight percent, and more preferably between about 0 weight percent to about 80 weight percent based on the weight of the composition. Generally, an average dimension of the inorganic filler particles is below about 1 mm, preferably below about 100 microns, more preferably below about 50 microns, and even more preferably below about 10 microns, and above about 2 nm, preferably above about 10 nm, more preferably above about 20 nm, and even more preferably above about 50 nm.

Optional Component—Reinforcing Fiber(s)

Reinforcing fiber also could be used as an optional composition in the vinyl ester product. Reinforcing fibers include, but are not limited to, glass fibers, carbon fibers and cellulose fibers.

The concentration of the optional reinforcing fiber may be from between about 0 weight percent to about 95 weight percent, preferably between about 0 weight percent to about 90 weight percent, more preferably between about 0 weight percent to about 80 weight percent based on the total weight of the composition.

Optional Component—Inhibitors

In an embodiment, the vinyl ester product can be mixed with standard inhibitors, such as benzo-, tolu-, naphtho-, trimethyl-, mono and ditert.-butyl-quinone and/or their hydroquinones, preferably hydro-, toluhydro-, 1,4-naphthohydroquinone, with catechols, preferably mono- and/or di.-tert.-butyl-catechol, or their monoalkyl ethers, with chloranil and soluble copper salts and/or -complexes, for instance copper naphthenate, -octoate, -acetyl-acetonate, with Cu(I)-chloride-phosphite complexes, or mixtures thereof.

The inhibitor is generally present in a range of from about 0 weight percent to about 10 weight percent, preferably from about 0 weight percent to 3 weight percent, and more preferably from about 0 weight percent to about 1 weight percent, based on the total weight of the composition.

Optional Component—Vinyl Monomers

The vinyl ester product can be further dissolved in unsaturated monomers to lower the viscosity. Examples of vinyl monomers that can be used include, but are not limited to those that are inert towards epoxide groups under the reaction conditions, such as styrene, ring-chlorinated and -alkylated or -alkenylated styrenes, where the alkyl groups contain 1-4 carbon atoms, such as vinyl-toluene, divinyl-benzene, α-methyl-styrene, tert-butyl-styrene, chlorostyrenes, vinyl esters of carboxylic acids with 2-6 carbon atoms, preferably vinyl acetate, -pyridine, -naphthalene, -cyclohexane, acrylic and methacrylic acid esters without functional groups, allyl compounds such as allyl-benzene and allyl esters such as allyl acetate, phthalic acid-diallyl esters, isophthalic acid-diallyl esters, allyl carbonates, triallyl-phosphonate, triallyl-cyanurate. In an embodiment, styrene is used.

The monomer is generally present in a range of from about 0 weight percent to about 95 weight percent, preferably from about 0 weight percent to about 80 weight percent, more preferably from about 0 weight percent to about 50 weight percent, and even more preferably from about 10 weight percent to about 40 weight percent, based on the total weight of the composition.

Other Optional Components

The vinyl ester product may further include a second thermosetting resin. The thermosetting composition may further include at least one solvent. The vinyl ester composition according to the invention may further include one or more additives chosen from additional flame retardants, additional toughening agents different from the oxazolidone ring containing adduct, curing inhibitors, wetting agents, colorants, thermoplastics, processing aids, dyes, UV-blocking compounds, and fluorescent compounds. This list is intended to be exemplary and not limiting.

The concentration of any of the other optional components which may be added to the composition of the present invention may be from between about 0 weight percent to about 20 weight percent, preferably between about 1 weight percent to about 15 weight percent, more preferably between about 2 weight percent to about 10 weight percent based on the weight of the composition.

The Curing Process

The composition of the present invention may be cured under the following conditions: 50-100° C. for 0.5 to 3 hours, 100-150° C. for 0.5 to 3 hours and 160-200° C. for 0.5 to 3 hours in a mold. Longer curing time and/or a higher curing temperature might be needed for cured products having higher cured Tg. The curing temperature and time depend on the levels of hardeners and the catalysts needed for different applications. The curing conditions are not limited to the current description.

The Product

Cured Product and Properties

The thermoset product (i.e. the cross-linked product made from the curable composition) of the present invention shows several improved properties over conventional epoxy cured resins. For example, the cured product of the present invention may have a glass transition temperature (Tg) of from about 80° C. to about 250° C. in one embodiment; from about 100° C. to about 200° C. in another embodiment; from about 120° C. to about 170° C. in yet another embodiment; and from about 130° C. to about 150° C. in still another embodiment.

The thermoset product of the present invention exhibits a flexural modulus of higher than about 3,200 MPa, preferably from about 2,900 MPa to about 4,000 MPa and more preferably from about 3,000 MPa to about 3,500 MPa.

The thermoset product of the present invention exhibits a flexural strength value of higher than about 130 MPa, preferably from about 110 MPa to about 150 MPa, and more preferably from about 120 MPa to about 140 MPa.

The thermoset product of the present invention exhibits a tensile modulus value of higher than about 2,900 MPa, preferably from about 2,700 MPa to about 4,000 MPa, and more preferably from about 2,800 MPa to about 3,500 MPa.

The thermoset product of the present invention exhibits a tensile strength value of higher than about 85 MPa, preferably from about 75 MPa to about 100 MPa, and more preferably from about 80 MPa to about 90 MPa.

End Uses

The curable composition of the present invention may be used in thermoset systems where conventional curable epoxy resins are used. Some non-limiting examples of applications wherein the formulation of present invention may be used include, for example, fiber reinforced composites made from various application methods including filament winding, pultrusion, resin transfer molding, vacuum assisted infusion and prepreg process. Another area is in electrical insulation and encapsulation by application methods including casting, potting and automatic pressurized gelation (APG) etc. The composition can also be used as potting material for road pavement and civil engineering. By adequate application methods like spray, roller, dip etc. the composition can also be used as coating for a great variety of end uses including ship, marine containers, machinery, structural steel frames, and automotive.

EXAMPLES

The following examples and comparative examples further illustrate the present invention in detail but are not to be construed to limit the scope thereof.

Ingredients:

D.E.N.™ 438 resin (Phenol Novolac Epoxy) from Dow Chemical Company

Adduct A an oxazolidone ring containing adduct which is synthesized by Dow Chemical Company Isonate™ OP 50

DBU (1,8-Diazabicyclo[5.4.0]undec-7-ene)

DMP-30 (Tri(dimethylaminomethyl)phenol)

Methacrylic acid

MPTS (Methyl toluene-4-sulphonate methyl)

Test Procedures:

Epoxide Equivalent Weight (EEW)

The ASTM method D1652 was used. EEW is determined by reacting the epoxides with in-situ produced hydrobromic acid. Hydrobromic acid is generated by the addition of perchloric acid to excess of tetraethyl ammonium bromide. The method is a potentiometric titration, where the potential of the titrated sample is slowly increasing upon the addition of the perchloric acid until hydrobromic acid is consumed by the epoxide. After the completion of the reaction a sudden potential increase occurs and that is indicative of the amount of epoxide present.

Acid Value Measurement

The acid value was determined by using the direct titration method, with acetone or methanol to dissolve the liquid resin solution until homogenous. KOH/methanol solution was used to titrate monitored by electrode titrator. After the completion of the neutralization, a sudden potential increase occurs and that is indicated of the amount of acid value.

Glass Transition Temperature

Glass transition temperature (Tg) was measured by differential scanning calorimetry (DSC). Approximately 5-10 mg of sample was analyzed in an open aluminum pan on a TA Instrument DSC Q2000 fitted with an auto sampler under $N_2$. Tg measurement by DSC was with 30-250° C., 10° C./min; 3 cycles. The liquid sample was cured at 80° C. for 8 hours and 120° C. for 8 hours respectively before the Tg measurement in order to eliminate any inconsistent results.

Gel Time and Exotherm Peak Temperature Measurement

Gel time was measured by a fixed column, 30 ml tube equipped with thermal couple which is located exactly in the middle of the tube and at fixed height, 3 cm above the bottom and an agitator which is located at the same place as thermal couple and connected with an electrical timer.

A 27-gram quantity of the liquid was charged into the tube with agitation and timer started to record the time. Gel time could be recorded by electrical timer while agitation was stopped because viscosity increased was too high during the gelling process, and exotherm peak temperature could be recorded by thermal couple.

Preparation of Oxazolidone Ring Containing Adducts Used for the Methacrylation

The oxazolidone ring containing adduct which was used in the inventive example is Adduct A which was synthesized in the laboratory. The reaction scheme is shown in Formula IV, below. The EEW of Adduct A is 238. Other epoxy resins used in the examples is D.E.N.™ 438 from Dow Chemical. EEW was tested as 179.

Formula IV: Phenol Novolac Epoxy-MDI (D.E.N.™ 438 with OP 50)

The procedure for the production of Adduct A was as follows:

Raw materials:
D.E.N.™ 438 (pure); 90 parts by weight; heat in oven @ 100° C. to reduce viscosity before loading.
OP-50 (MDI): 10 parts by weight; weighted into addition funnel before addition.
DBU (1,8-Diazabicyclo[5.4.0]undec-7-ene, Mw=152.14; 70 wt % in xylene): 0.15 wt % (1500 ppm) of pure DBU on total weight of epoxy+MDI The D.E.N.™ 438 was loaded into a 1 L 4-neck flask equipped with mechanical stirring, oil bath heating, a $N_2$ inlet/outlet and a thermal couple. The D.E.N.™ 438 was then stirred at a temperature of about 150-155° C. at 350 rpm for 1 hour in order to remove any water. The 70 wt % DBU solution was then added drop wise at 150° C., the mixture was then stirred for 5 minutes. The temperature was then increased to 160° C., and the OP-50 MDI was added drop wise to the mixture. The addition rate of the MDI and the oil bath height was controlled, which allowed the temperature to increase to 170° C. in 5 minutes. Then, the addition rate and oil bath height were controlled in order to maintain a temperature of 170-175° C. The drop wise addition of the MDI was completed within 50 minutes. The addition rate was slightly faster in the beginning, and was slower in the end in order to avoid gelation. The stirring speed was held at 350 rpm to avoid gelation. Generally, if the initial sign of gelation occurs (a sudden slow-down or immobilization of the surface liquid), the stirring rate should increase up to about 400~600 rpm and the MDI addition should be stopped instantly.

After the MDI addition was completed, the solution was stirred at the same speed and temperature for about another 30 minutes. When the EEW ranged from 238-248 and melting viscosity at 150° C. was about 0.9 Pa·s to 1.5 Pa·s, the reaction was then stopped and the product was quickly poured out onto aluminium foil.

Example 1

Synthesis of D.E.N.™ 438/ADDUCT A=80:20 VER Solution

A flask was cleaned with methyl ethyl ketone. A 480-gram quantity of D.E.R.™ 438 and 120 grams of Adduct A were charged into the reactor and the temperature was increased to 95±5° C. with maximum stirring to form a homogenous mixture. The mixture was purged with nitrogen and air. A 1.31-gram quantity of Hycat 3000S, 2.61 grams of DMP-30, 0.35 grams of MEHQ (Monomethyl Ether of Hydroquinone) and 0.35 grams of PTZ (pheothiazine) was dissolved in 91 grams of methacrylic (⅓ quantity of total methacrylic acid) to form a transparent, homogenous solution.

The methacrylic solution was then charged drop wise into the reactor while the heat temperature was set at 95° C. for 1 hour. A 182-gram quantity of pure methacrylic acid was charged drop wise into the reactor in 2 hours while the heating temperature remained at 95° C.

After the addition of the methacrylic acid was fully completed, the temperature was increased to 115° C. After the temperature was held at 115° C. for 3 hours, samples were obtained to measure the acid value and EEW.

The reaction was stopped when the acid value was less than 2 mg KOH/g and the EEW was above 10000. The temperature was then decreased to 85° C., and 378 grams of styrene was charged into the reactor to cut the viscosity and form the VER solution.

Example 2

Synthesis of D.E.N.™ 438/ADDUCT A=90:10 VER Solution

The preparation procedure is the same as the above synthesis; with the difference that the methacrylic acid amount and final styrene amount need to be re-calculated according to the equivalent ratio and weight ratio respectively since the epoxy equivalent weight is different from the mixture of D.E.N.™ 438/Adduct A=8:2, above.

Example 3

Synthesis of D.E.N.™ 438 VER Solution

The preparation procedure is the same as the above synthesis; with the difference that the methacrylic acid amount and final styrene amount need to be re-calculated according to the equivalent ratio and weight ratio respectively since the epoxy equivalent weight is different from the mixture of D.E.N.™ 438/Adduct A=8:2, above.

The summary of the different VER solution compositions are described in Table I, below. The figures are weight percents.

TABLE I

|  | Example 3 D.E.N.™438 VER | Example 2 D.E.N.™ 438/Adduct A 90:10 | Example 1 D.E.N.™ 438/Adduct A 80:20 |
|---|---|---|---|
| D.E.N. 438 | 47.09 | 42.65 | 38.27 |
| Adduct A | — | 4.74 | 9.57 |
| MAA | 22.63 | 22.19 | 21.77 |
| DMP-30 | 0.21 | 0.21 | 0.21 |
| Hycat 3000S | 0.1 | 0.11 | 0.1 |
| MEHQ | 0.07 | 0.07 | 0.07 |
| PTZ | 0.03 | 0.03 | 0.03 |
| Styrene | 29.87 | 30.01 | 29.99 |

Test data results are shown in Table II, below.

TABLE II

|  | Example 3 D.E.N. 438 VER | Example 2 D.E.N. 438/Adduct A = 9/1 VER | Example 1 D.E.N. 438/Adduct A = 8/2 VER |
|---|---|---|---|
| Co-6 | 1.075 | 0.075 | 0.075 |
| Gel time(min) | 16'80" | 23'36" | 29'54" |
| Exotherm peak (° C.) | 134.5 | 135.5 | 137.4 |
| Tg (80° C., 8 hours post cure) | 163 | 166 | 180 |
| Tg (120° C., 8 hours post cure) | 165 | 172 | 178 |

Table II shows that the Tg increases when Adduct A was incorporated with D.E.N.™ 438 in a vinyl ester formulation, which indicates that the oxazolidone ring has an impact in helping to increase thermal properties. It is shown that the gel time increases from 16'80" to 29'54" which means a bigger processing window can be achieved when using the vinyl ester based on an oxazolidone epoxy resin.

Figure 1:
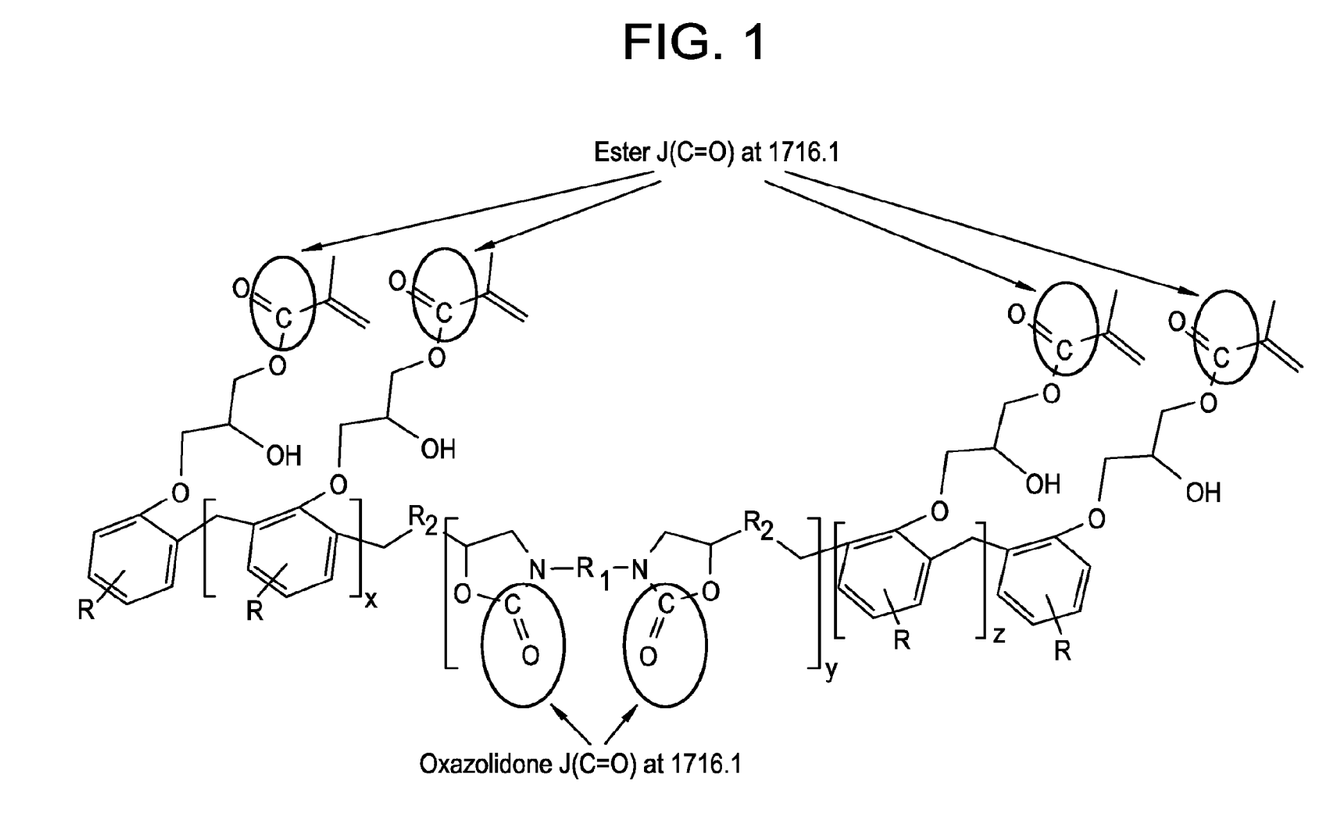
FIG. 1 shows a vinyl ester compound containing oxazolidone and ester functional groups.
Figure 2:
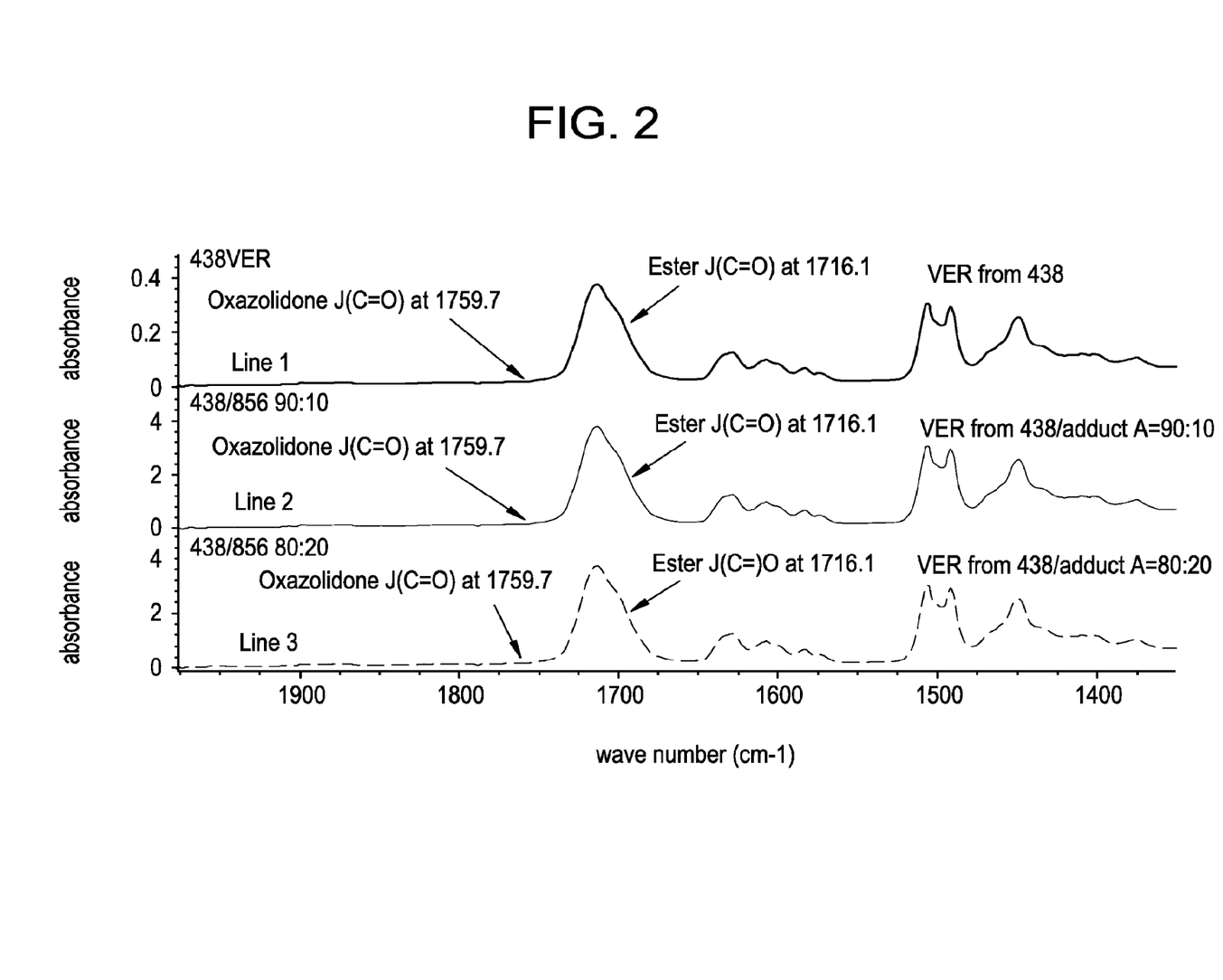
FIG. 2 shows a FT-IR spectra of D.E.N.™ 438, D.E.N.™ 438/Adduct A=90:10 ratio, and D.E.N.™ 438/Adduct A=80:20 ratio.

FIG. 2 shows the FTIR spectra of these compositions. The oxazolidone rings of the compositions produced in the examples have a wavenumber of 1759 cm$^{-1}$. The wavenumbers of ester groups and oxazolidone rings are shown in FIG. 1. Oxazolidone rings appear in this section of the IR spectra, as is evidenced in the examples of U.S. Pat. No. 5,112,932, herein incorporated by reference.

What is claimed is:

1. A process comprising:
   contacting
   a) an epoxy resin;
   b) an adduct comprising at least one oxazolidone ring prepared from
      i) a multifunctional epoxy resin selected from the group consisting of phenol novolac epoxy resins, cresol-novolac epoxy resins, bisphenol-A novolac epoxy resins, epoxidized tetrafunctional phenol ethane, epoxidized cyclohexane tetraphenol, trisepoxy resins, polyfunctional epoxy resins, naphthalene epoxy resins, divinylbenzene, dicyclopentadiene-type epoxy resins, phosphorous containing epoxy resins, multi aromatic epoxy resins, and mixtures thereof, the multifunctional epoxy resin having a functionality of more than 2.1 and an EEW of from 100 to 300;
      ii) an isocyanate compound; and
      iii) a catalyst selected from the group consisting of 1,8-Diazabicyclo[5.4.0]undec-7-ene, 2-methyl imidazole, 2-phenyl imidazole2-PhI, phosphonium and 30 ammonium salts; and
   c) an unsaturated acid
   to form a vinyl ester.

2. The process of claim 1, wherein the epoxy resin is selected from the group consisting of phenol novolac epoxy resins, cresol novolac epoxy resins, bisphenol-A novolac epoxy resins, tris-epoxy resins, epoxidized tetrafunctional phenol ethane, epoxidized cyclohexane tetraphenol, dicyclopentadiene epoxy resins, and mixtures thereof.

3. The process of claim 1 wherein the isocyanate compound has two or more isocyanate groups and an IEW of from 100 to 500.

4. The process of claim 1 wherein the isocyanate compound is a polymeric isocyanate compound.

5. The process of claim 1, wherein the unsaturated acid is selected from the group consisting of acrylic acid, methacrylic acid, cinnamic acid, crotonic acid, sorbic acid, monomethyl maleate, monobutyl maleate, half esters of unsaturated dibasic acids, and combinations thereof.

6. The process of claim 1, wherein the adduct is present in a range of from about 0.1 weight percent to about 100 weight percent, and the unsaturated acid is present in a range of from about 1 weight percent to about 60 weight percent.

7. The vinyl ester formed by the process of claim 1.

8. The vinyl ester of claim 7, represented by the formula wherein
- $R_1$ is selected from the group consisting of a phenyl ring structure, a polymeric phenyl ring structure and derivatives thereof;
- $R_2$ is selected from the group consisting of a phenoxy ring structure, a polymeric phenoxy ring structure and derivatives thereof;
- $R_3$ is selected from the group consisting of an alkyl group, an alkoxy group, a phenyl ring structure, a polymeric phenyl ring structure, derivatives of phenyl ring structures, and derivatives of polymeric phenoxy ring structures;
- R is selected from the group consisting of a hydrogen group, an alkyl group, an alkoxy group, a phenyl ring structure, a polymeric phenyl ring structure, derivatives of phenyl ring structures, derivatives of polymeric phenyl ring structures, a phenoxy ring structure, a polymeric phenoxy ring structure, derivatives of phenoxy ring structures, and derivatives of polymeric phenoxy ring structures;
- x is an integer between 0 and 5;
- y is an integer of at least 1; and
- z is an integer between 0 and 5.

9. The process of claim 1 further comprising:
   d) contacting the vinyl ester with a vinyl monomer.

10. The process of claim 9 wherein the vinyl monomer is selected from the group consisting of styrene, ring-chlorinated styrenes, alkylated styrenes, alkenylated styrenes, vinyl esters of carboxylic acids with 2-6 carbon atoms per molecule, acrylic and methacrylic acid esters without functional groups, allyl compounds and combinations thereof.

* * * * *